B. A. FISKE.
INSTRUMENT FOR MEASURING DISTANCES OPTICALLY.
APPLICATION FILED MAY 10, 1915.
1,208,120.
Patented Dec. 12, 1916.
2 SHEETS—SHEET 1.
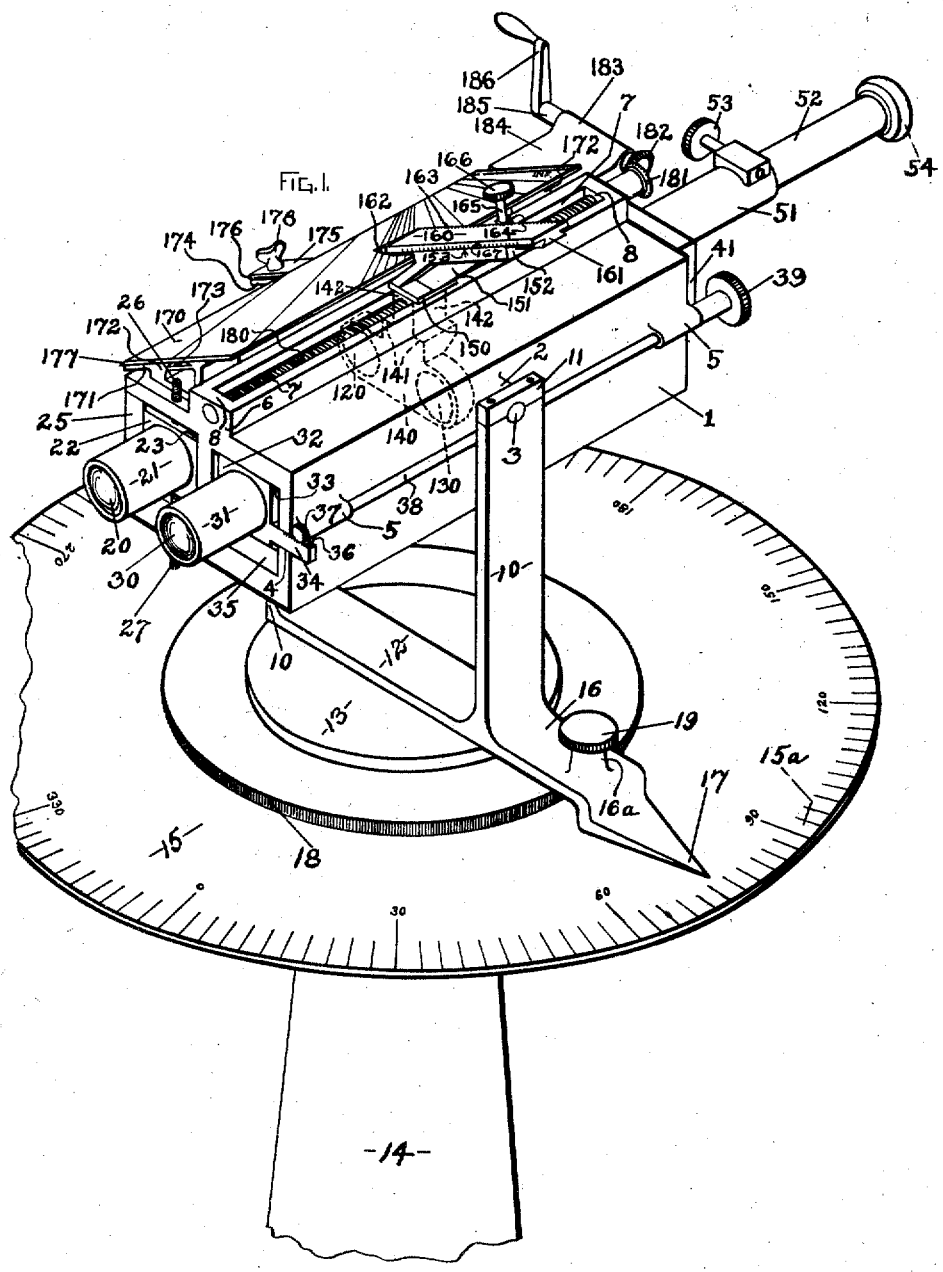
WITNESS
George A. Page
INVENTOR
Bradley A. Fiske
BY
ATTORNEYS

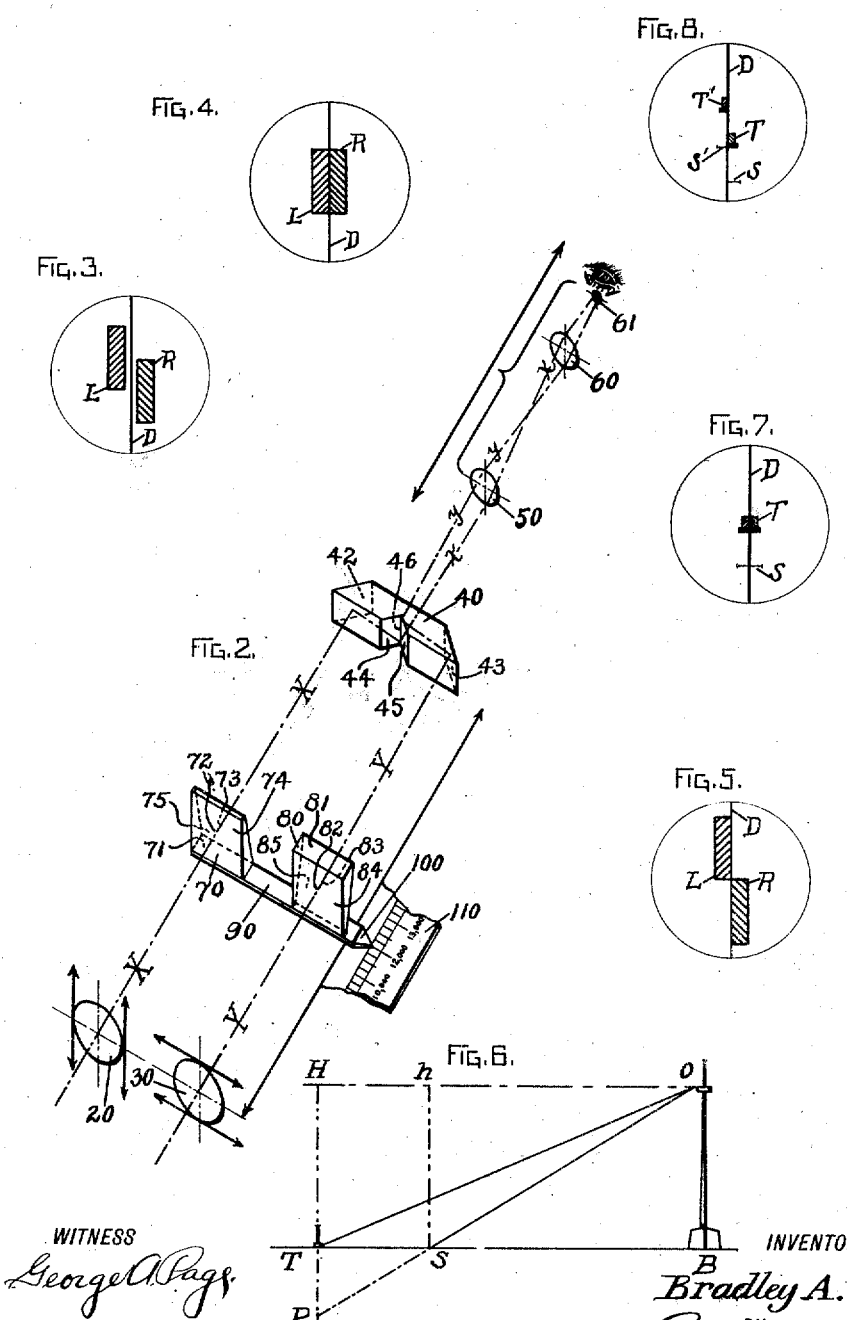

UNITED STATES PATENT OFFICE.

BRADLEY A. FISKE, OF THE UNITED STATES NAVY, ASSIGNOR TO BAUSCH & LOMB OPTICAL COMPANY, OF ROCHESTER, NEW YORK, A CORPORATION OF NEW YORK.

INSTRUMENT FOR MEASURING DISTANCES OPTICALLY.

1,208,120.  Specification of Letters Patent.  Patented Dec. 12, 1916.

Application filed May 10, 1915. Serial No. 26,932.

*To all whom it may concern:*

Be it known that I, BRADLEY A. FISKE, a citizen of the United States, and Rear Admiral of the United States Navy, and residing at Washington, in the District of Columbia, have invented certain new and useful Improvements in Instruments for Measuring Distances Optically; and I do declare the following to be a full, clear, and exact description of the same, reference being had to the accompanying drawings and to the characters of reference marked thereon.

My invention relates to distance measuring instruments or range finders of the optical type whereby the distance of an object may be measured by determinating the angle that it subtends and more particularly relates to that class of instrument wherein the distance of an object from the position of the instrument may be determined from the size of said object's image formed on the focal plane of the instrument, provided one dimension of the object in a plane that is substantially parallel to the said focal plane, is known.

Objects of the present invention are: to provide an improved distance measuring instrument which is capable of greater accuracy and better consistency of measuring; which is more widely useful and which gives a better illuminated image than instruments heretofore known and used for similar measuring purposes.

Other objects of this invention will hereinafter become apparent.

My invention comprehends an arrangement of parts for accomplishing the objects hereinafter set forth, of which the apparatus described is one embodiment, the novel features of the invention being more particularly pointed out in the appended claims.

In the drawings: Figure 1 is a perspective view of an instrument embodying my invention. The particular instrument shown in the drawings I have sometimes referred to, more or less arbitrarily as a horizometer. Fig. 2 is a perspective diagram on an enlarged scale of the optics of the instrument shown in Fig. 1, together with certain other coöperating elements. Figs. 3, 4, 5, 6, 7, and 8 are diagrams illustrating the use of the instrument shown in Fig. 1.

Like characters of reference throughout the several figures of the drawings indicate the same or similar elements.

Referring now more particularly to the instrument which is shown in the drawings and which serves as an illustration of an embodiment of my invention: The numeral 1 denotes the body of the instrument which is pivotally mounted in the standards 10 by means of the laterally extending trunnions 2 having reduced portions 3 which have bearings in the upper ends of the standards 10 in which bearings the said reduced portions of the trunnions are secured by the bearing caps 11. It will be noted that but one trunnion and bearing is visible in the drawings but it is evident that both may be and usually are identical.

The standards 10 are mounted on a base 12 which base may be integral with the plate 13 which plate is rotatable about a vertical axis due to the said plate being mounted on a suitable vertical bearing or pivot, (not shown) such *e. g.* as provided for a surveyor's transit. The pivot bearing for the plate 13 may be mounted in the stand for the instrument of which the pedestal 14 and the table 15, integral with the said pedestal, form a part.

The base 12 is provided with an extension 16, which after being offset in order to bring its lower surface adjacent to the upper surface of the table 15, terminates in a point or index 17 which index coöperates with the radial graduations 15$^a$ engraved on the upper surface of the table 15 and adjacent to the periphery thereof.

A reduction gear, providing a comparatively delicate means for turning the instrument about its vertical axis is incorporated in the instrument and comprises a comparatively large gear 18 which is disposed between the plate 13 and the table 15 and is preferably rigidly secured to said table 15. Meshing with the gear 18 is a pinion which is mounted on a suitable spindle (pinion and spindle not shown) the said spindle being journaled in the boss 16$^a$ which boss is formed integrally with extension 16, and the end of the said pinion spindle terminating in the knob or pinion-head 19. Thus the rotation of the pinion-head 19 slowly rotates the instrument about its axis, the relative speed depending on the relative size of the gear 18 and its coöperating pinion, The instrument is provided at its forward end with two objectives 20 and 30 respectively, which are spaced apart in a direction transverse to their axes. The objective 20 is mounted in a tubular mount 21 which may be integral with a base portion 22. The two vertical sides of the base 22 are preferably beveled and fit snugly but easily in a dove-tailed slide 23, one of the inclined walls of which is provided by an adjusting gib 25. Thus the objective 20 and its mounting may be bodily raised and lowered, for a purpose hereinafter explained, and this movement or adjustment is controlled by the adjusting screws 26 and 27 which are threaded into the metal of the body 1 and respectively bear against the upper and lower portions or top and bottom of the base 22. The objective 30 is mounted in a tubular mount 31 which may be integral with a base portion 32. The upper and lower portions, or the top and bottom of this base portion are preferably beveled and fit snugly but easily in a dove-tailed slide 33, one of the inclined walls of which is provided by an adjusting gib 35. Thus the objective 30 and its mounting may be bodily shifted laterally for a purpose hereinafter explained, and this movement or adjustment is controlled by a rack and pinion mechanism comprising an extension 34, which extension passes through recess 4 and which is provided with teeth 36 which are engaged by a small pinion 37, mounted on the end of a shaft 38 which is journaled in the bearings 5, 5 and provided at its rear end with a knob 39.

In the diagram, Fig. 2 of the drawings, the objective 20 is indicated as vertically adjustable by the arrows adjacent thereto, the said arrows representing the slide-way 23 and indicating the possible direction of adjustment. The horizontal arrows adjacent the objective 30 in the same figure similarly indicate the horizontal adjustment of objective 30.

Within the body of the instrument and adjacent its rear end is mounted a prism 40, which I will call an ocular prism. A desirable positioning of this prism may be seen from Fig. 2 and will be hereinafter explained. The prism 40 is preferably adjustably mounted in any suitable well known manner affording universal adjustment for initially positioning the prism, in a sort of rectangular box 41 forming an extension of the rear end of the body 1 of the instrument the member 41 being rigidly secured to the said rear end of the instrument body. The member 41 also carries the telescoping ocular tubes 51 and 52. The tube 51, which is a simple tube particularly designed to guide and carry the tube 52, is secured to the rear face of the member 41 from which it projects in the direction of the longitudinal axis of the instrument. Within the tube 52 are mounted an erecting system 50, and preferably a Ramsden ocular comprising the collective lens 60 and the eye lens 61. A rack and pinion adjustment is provided to facilitate the adjusting of the tubes 51 and 52 relatively to each other, the rack (not shown) being preferably cut in or mounted on the tube 52 and the pinion being rigidly mounted on the tube 51, as shown. Thus the erecting system and the eyepiece system which form an integral unit are bodily movable to and from the ocular prism 40 for the purpose, e. g. of adapting the instrument to eyes of different refractive properties. This condition is indicated in Fig. 2 by the bracket connecting the elements of the erecting system and the eye-piece system, the adjacent arrow indicating that the unit is movable and also indicating the direction of such movement.

The numeral 54 indicates a form of the usual eye shield provided for the comfort and benefit of the person using the instrument.

Referring now only to the instrument as thus far described, presuming that its objectives 20 and 30, its ocular prism 40, its erecting system 50 and its ocular 60—61, are all arranged substantially as indicated in Fig. 2 and presuming that it has been duly adjusted: This much of the instrument comprises what may be termed a simple azimuth telescope instrument and its field of view when trained on an object appears as represented in Fig. 4, for example, the rectangle R—L representing the object sighted and the line D representing a line which divides the field into two equal halves as shown. The line D is shown in Fig. 4 as bisecting the object R—L which would indicate that the instrument is directly trained on the said object. This much of the instrument alone however, is incomplete and its functions adaptable to practical use are limited chiefly to the measuring of angles in azimuth and in this respect the instrument forming the subject of my present invention is adapted to use e. g. as a "pelorus" instrument when suitably mounted on board ship. However in the complete instrument shown I preferably interpose between the objectives 20 and 30 and the ocular prism 40 a pair of wedges 70 and 80 respectively. These wedges are arranged as shown in Fig. 2, the wedge 70 with its base 71 down and wedge 80 with its base 81 up. These wedges are mounted together in a carriage 90 which carriage is suitably mounted on guide-ways so as to be movable along the axes of the objectives 20 and 30 in the intervening space between the said objectives and the ocular prism 40. The carriage carries a suitable pointer 100 which coöperates with a suitable scale 110 in a manner and for purposes hereinafter explained. The long arrow in Fig. 2 shown adjacent the pointer 100 and the scale 110 suggests the length of travel of the wedges and indicates the direction of their motion for adjustment. The description relating to the introduction of the wedges into the structure of the instrument has thus far been rather general and has been confined somewhat for illustration to the Fig. 2 wherein the elements for simplicity and clearness sake have been indicated in their simplest or even in a conventional form. In this connection it will be noted that where the form or construction of certain elements shown in Fig. 1 apparently differ from those shown in Fig. 2, these shown in Fig. 1 are usually preferable.

In usual practice I may prefer to employ achromatic wedges of circular construction, such as shown in Fig. 1 in dotted lines, and indicated by the numerals 120 and 130. These wedges I preferably mount in a carriage 140 also shown in Fig. 1, partly in dotted lines. The upper portion of the carriage 140 is provided with shoulders 141 which extend laterally from a head portion 142. On top of this head is secured the base plate 150 of the bracket 151 that is designed to carry the variable length pointer member 160. The under side of the base plate 150, the sides of the head portion 142 and the shoulders 141 form a pair of oppositely disposed rectangular guide-ways; the upper surface of the raised projection 6 of the body 1, the sides of the slot 7 through the said projection 6 and a finished surface within the body (which surface coöperates with the shoulders 141) forming the guides along which the above described guide-way of the carriage 140 slides, after the manner of the cross head and guides of a steam engine.

The numeral 170 denotes an inclined scale plate which is mounted so as to be longitudinally adjustable. To this end a sort of sub table 171 having an inclined top which runs the length of the instrument and is provided at each end with the stands 172 whereby the said sub-table is secured to the one side of the top of the body 1 of the instrument is provided. Along the upper surface of the sub-table 171 runs a dove-tail groove in which fits the dove-tailed slide 173 which is secured to the under side of the scale plate 170. About midway along the lower edge of the sub-table 171 is formed, preferably integral therewith, an extending ear 174 which is provided to support the clamp plate 175. This clamp plate at its end 176 bears on the ear 174 and at its opposite end bears on the bevel 177 of the scale plate 170. By means of the thumb screw 178 which passes through the clamp plate 175 and is threaded into the ear 174, the clamp plate securely holds the scale plate 170 in any adjusted position to the top surface of the sub-table 171. In its normal position the scale plate and the sub-table may be flush, thus affording a means for determinating the normal position of the scale plate.

The head 152 of the bracket 151 is provided with a dove-tailed groove in which slides a dove-tail slide portion 161 formed on the under side of the pointer member 160. The bracket head 152 is so inclined and disposed that the under side of the pointer member 160 carried thereby lies in a plane that is parallel to the plane of the upper surface of the scale plate 170 and adjacent thereto and thus the indicating point 162 will be uniformly close to the scale no matter what relative position the scale and pointer may occupy.

One side of the pointer member 160 is provided with a rack 163 with which meshes a pinion 164 mounted on a spindle 165 which is journaled in the bracket head 152 and which spindle is provided on its upper end with a head 166 whereby the indicating point 162 of member 160 may readily be moved transversely across the scale 170. The pointer member is further provided with a scale 167 with which coöperates an index 153 on the bracket head 152.

For moving the carriage 140 and the elements carried thereby along the axis of the objectives 20 and 30 and for rigidly holding same in any adjusted position I prefer to provide the worm 180 which is threaded through the head 142 of the carriage 140 as shown. This worm is journaled in the body of the instrument at 8 at each end of the slot 7 wherein the said worm sets. On the rear end of the worm which is preferably provided with a reduced end portion (not shown) is mounted a bevel gear 181, the hub of the said bevel gear and the shoulder at the end of the worm coöperating with the rear bearing portion 8 to form a thrust bearing for the worm 180. Meshing with bevel gear 181 is a bevel gear 182 which is mounted on a spindle (not shown) which spindle is journaled in the boss 183 of the bearing bracket 184 which bracket is secured to and extends rearwardly from a rear corner of the body 1 as shown. On the opposite end of the spindle upon which the gear 182 is mounted is secured the hub 185 of the crank handle 186 which crank is obviously for the purpose of rotating the worm 180 in a manner that is clearly apparent.

The primary function of the optical system of this instrument, best shown in Fig. 2 of the drawings, is to form an image of an object, the two halves of which image may be relatively displaced.

In the present embodiment of my invention I prefer to divide the image vertically into the two halves R and L which halves may be vertically displaced, see Figs. 4 and 5. The junction of the two halves of the image is represented in the drawings by the halving line D which line occurs in the center of the field vertically. In actual practice this halving line usually appears as a fine line which as hereinabove explained is designed to function also as a sighting line.

The instrument having been trained on an object, each of the objectives 20 and 30 receives a cone of image forming rays which cone of rays each objective transmits and refracts in passage. The axial rays X and Y represent cones each of which cone will form a complete or whole image. In the further discussion of the light paths the path of the axial rays X and Y alone will be described. Having passed through the objectives the rays X and Y impinge on the perpendicular surfaces 74 and 84 of the respective wedges at 72 and 82 respectively. The rays X and Y pass on to the surfaces 75 and 85 respectively where they emerge at 73 and 83 the ray X being refracted downwardly and the ray Y being refracted upwardly. The rays X and Y passing through the front surface of the ocular prism 40 impinge on the primary reflecting surfaces 42 and 43 respectively from which the said rays are inwardly reflected, the ray X continuing to fall and the ray Y continuing to rise, as is clearly shown in Fig. 2, until the rays X and Y impinge on the secondary reflecting surfaces 44 and 45 the intersection 46 of which surfaces is in the common focal plane of the objectives 20 and 30. It will be noted that the axial rays X and Y impinge on the intersection 46, and it will be observed that the said intersection lies in a straight line between the centers of the reflecting surfaces 42 and 43, therefore while a full image cone was reflected from each of the surfaces 42 and 43, only half of each image X and Y is picked up by the reflecting surfaces 44 and 45, the halves however being the two complementary halves of the image, as R and L in the drawings, and thus when the said half images are brought together a complete and perfect image is formed.

Since from 46 on only a half image is reflected, the rays X and Y from 46 on are designated $x$ and $y$ respectively. From the reflecting surfaces 44 and 45 on through the erecting system 50 the eyepiece 60—61, the path and action of the rays $x$ and $y$ is deemed to be clearly apparent without further description. The field of view resulting from the course of the light rays just described in connection with Fig. 2 is shown in Fig. 5 it being presumed that the scale 100 is made for an object of 100 feet in height, that the object is 12,000 yards distant and that the object R—L in this case is 100 feet high.

Knowing the focal length of the objectives 20 and 30 and knowing one dimension of an object in a plane parallel to the focal plane of the objectives, e. g. the height of an object, if we measure the height of the image we have according to the law of magnification:

$$\text{Distance of object from objective} = \frac{\text{Focal length of objective (times) height of object}}{\text{Height of image}}$$

for all distances that are great as compared with the focal length of the objective. This formula actually gives the distance of the object from the anterior focal point of the objective and thus if absolute accuracy is required, it is simply necessary to add the focal length of the objective. But since the focal length of the objective is so extremely small as compared with the distance measured, it is a negligible increment and thus has been omitted as a term in the above equation.

Between the objectives 20 and 30 and their focal plane wherein appears the two part image R—L, I interpose the wedges 70 and 80 for the purpose of vertically displacing the two halves; it being obvious that knowing the refracting angle of the wedges and having refracted the right portion R of the image R—L half its height downwardly and having refracted the left portion L of the image R—L half its height upwardly so that the top of the image portion R and the bottom of image portion L coincide, see Fig. 5: I can, by measuring the distance of the wedge from the focal plane, accurately measure the height of image R—L, found on the focal plane of objectives 20 and 30. However, instead of the scale 110 measuring merely the distance of the wedges from the focal plane, the scale may be graduated in terms of the size of the image or what is most preferable, the said scale may be graduated to read in terms of the distance of the object sighted from the objective, as shown in Fig. 2, the scale 110 being supposed to be designed to read in yards of distance of object, the object in this case always being supposed to be 100 feet in height.

A study of the Fig. 2 will, in consideration with what has been said, show that the nearer the object is, the farther from the focal plane and the nearer to the objectives, the wedges 70 and 80 must be moved to effect coincidence and vice versa. When the instrument described is trained on an object that is at any distance and adjusted so that the two images are complementary and form a complete image, the image in the field of the instrument looks as shown at R—L in Fig. 4 the halving line D passing through the image as shown, and the range scale should read "Infinity." It is for securing this "infinity coincidence" as shown in Fig. 4 that the vertical adjustment of objective 20 is provided. When adjusting the instrument for infinity it is desirable to see that the wedge carrier 140 is not too near the end of its stroke since it is sometimes desirable that the wedges be movable in both directions from this point.

In order that the instrument be not limited in its application to objects of a certain height I provide for the instrument a scale 170 the lower edge adjacent the bevel 177 being graduated for example for a 50 foot height of object and the opposite edge of the scale for a 150 foot height of object and by connecting the two scales with suitable inclined lines or curves, any straight line drawn along the scale parallel to beveled edge 177 will constitute a scale for some height between 50 feet and 150 feet depending on its position relative to the two longitudinal sides of the scale.

Coöperating with scale 170 is an adjustable pointer member 160, which, when the point 162 of the said member registers with the lower or 50 foot portion of the scale 170, reads 50 feet on scale 167 and when the pointer 162 registers with the upper or 150 foot portion of the scale 170, the scale 167 of the pointer member reads 150 feet. Suitable intermediate graduations are provided for the scale 167 so that the instrument may be set for any height of object for instance, between 50 and 150 feet in height.

The instrument herein described is particularly adapted to use for range finding, spotting and the measuring angles in azimuth and forms a very convenient and reliable means for accomplishing these ends.

In using this instrument for range finding, an object or portion of an object is selected, and if its height be known or may be estimated the scale 167 is set accordingly, the instrument is trained on the object and the crank 186 is turned until the image appears as shown in Fig. 5 which is the "range coincidence" and the distance or range is read as indicated by pointer 162. In Fig. 1 of the drawings, the first line on the scale 170 is parallel to the line of travel of member 160, this is the "infinity" and is marked "INF". The measuring lines shown from "INF" down may be considered to represent respectively ranges of 75,000; 37,500; 25,000; 15,000; 12,500; 10,000; 9,500; 9,000; 8,500; 7,500; 5,000 and 4,000 yds. Thus the pointer 162 in the position shown in Fig. 1 indicates a range of about 7,000 yards, the intermediate ranges between lines being in the present case, estimated. However other more exact known means may be provided. If on the other hand, the height of an object is not known and it is not suitable to estimate the height thereof the instantaneous range may be obtained by an independent means such as any well known range finder, the "range coincidence" effected in the present instrument by turning crank 186 and then pinion head 166 turned until pointer 162 indicates the range known after which the height adjustment may be maintained for all ranges of the same object.

In using the present instrument for "spotting", referring now particularly to Figs. 6, 7 and 8: The distance of the target T from the ship B being known and the height of the observer at O being known; the instrument (located at O) is trained on the object T as indicated by the line O T Fig. 6, and infinity coincidence of the target T is made as shown at T Fig. 7. The scale 167 is then set to the height O B and the clamp 176 being loosened, the scale is shifted until the pointer 162 intersects the distance represented by B T, when the scale is clamped in place and the instrument is in readiness for "spotting". The shot fired, the projectile falls at S Fig. 6 making the usual splash which shows in the field of the instrument and is indicated by the line S in Fig. 7. Immediately the crank 186 is turned until coincidence of the water line of half the target image Fig. 8 and half the splash S' in the same figure is made as indicated in Fig. 8. The range or distance indicated by pointer 162 is the distance B S. The direction in which the crank 186 is to be turned is governed by whether the image of the splash S appears above or below the image of the target T. If the splash appears to be above the target and consequently the point S Fig. 6 is beyond the target T, the wedges should be moved closer to the focal plane so that the distance S B will read greater than the distance B T is known to be, and if the splash appears to be below the target the converse is true.

The manner in which the "spotting" is effected by this instrument is indicated clearly in Fig. 6 in which the line O H is a horizontal line parallel to the water line B T; P indicates the projection of the point S on the plane of the target H P and H S indicates the height of object on base line H T moved from T to S. The instrument described is placed at O. The figure 6 is considered to be a graphic solution of the problem met in "spotting".

The lateral adjustment of the objective 30 is provided to cure a condition of the image shown in Fig. 3 and may aptly be called the "image separation" adjustment, the bringing of the objectives 20 and 30 closer together bringing the image halves together as is required in Fig. 3, and the separation of the objectives 20 and 30 tending to separate the halves R and L.

For the purpose of insuring a very fine and sharp dividing line D in the field of the instrument the ocular prism 40, in practice, is made in two parts and cemented together. This is accomplished by making one of these parts a perfect rhomboid of the same height and of the same thickness from front to back, as the prism 40, and having its ends inclined at an angle of 45 degrees to its longitudinal axis. The complementary portion of the prism is made by cutting off one of the acute extremities of a similar rhomboid from the center of the end surface at right angles thereto, the resulting prism thus having one acute single beveled end and one blunt double beveled end. One of the inclined end surfaces of the rhomboid prism portion is silvered for half the length from its blunt edge toward its acute edge, and to the remaining clear glass half of this surface is cemented that surface of the double beveled end of the complementary portion of the prism that extends at right angles to the surface of its single beveled end. The completed ocular prism, see Fig. 2, is in effect one integral piece of glass since the cemented surfaces of the two parts of the prism are so cemented together that they have no optical effect but transmit the light rays in the same manner as the glass of the prism itself. One of the inclined end surfaces of the rhomboid prism portion will thus probably form the surface 43 of the finished ocular prism while half of the corresponding parallel end surface of this rhomboid will form the surface 45. The surface of the single beveled end of the complementary portion of this prism will form the surface 42 and that surface of the double beveled end which is parallel to the surface of the single beveled end and which preferably has been silvered, will form the reflecting surface 44. Each of the reflecting surfaces of the prism 40 may be silvered if desired.

The using of the herein described instrument as a "pelorus" is believed to need no further description.

While the present embodiment of my invention herein described employs two optical wedge elements, one on the axis of each objective, it will be observed that one wedge element only might be used, it being feasible to dispose said wedge element on the axis of either objective. In this case the brilliancy of that portion of the image which has to pass through the wedge would be somewhat subdued as compared with the remaining portion of the image; only one half of the image would move on the focal plane, so that greater travel of the wedges would be necessary for the range adjustment; and the field of view of the instrument would not be utilized to as great advantage as in the present embodiment shown, because when range coincidence had been effected, the image would occupy an eccentric position in the field of view, especially in the case of short ranges.

Having thus described a single embodiment of my invention what I claim and desire to secure by Letters Patent of the United States is:

1. In an optical instrument for measuring distances, the combination of a transversely adjustable objective, a second objective spaced from the first named objective in a direction substantially normal to the direction of the adjustment thereof and adjustable toward and from said objective, of an ocular and an image uniting prism coöperating with the objective to form in the field of the instrument a single divided image of an object, comprising a pair of complementary half images received one half from each of the objectives and arranged one on either side of a dividing line, means operating between the image uniting prism and the objectives and acting on the light transmitted by the latter to adjust the image halves one with relation to the other to a greater or lesser extent, and means for translating the displacement of the image halves into terms of range of the object.

2. In an optical instrument for measuring distances, the combination of a transversely adjustable objective, a second objective spaced from the first named objective in a direction substantially normal to the direction of the adjustment thereof and adjustable toward and from said objective, of an ocular and an image uniting prism coöperating with the objective to form in the field of the instrument a single divided image of an object, comprising a pair of complementary half images received one half from each of the objectives and arranged one on either side of a dividing line, a pair of refracting wedges arranged one in the axis of each objective and mounted to be movable simultaneously along said axes, a carriage for the wedges, an index carried thereby and a scale coöperating with the index.

3. In an optical instrument for measuring distances, the combination with an ocular and an image uniting prism having a pair of primary reflecting surfaces arranged at either end thereof, and a pair of intersecting secondary reflecting surfaces arranged intermediate the primary reflecting surface with their intersection in the axis of the ocular, of an objective lens arranged in line with each of the primary reflecting surfaces of said prism said objectives each being individually adjustable in a direction disposed at right angles to the direction of adjustment of the other and transversely to their axes, means operating between the image uniting prism and the objectives and acting on the light transmitted thereby to shift the image formed by one objective with relation to the image formed by the other.

4. In an optical instrument for measuring distances, the combination with a pair of transversely spaced objectives each adapted to form an image of an object, an ocular and an image uniting prism adapted to select complementary halves of each of said images and unite them in the field of the ocular as a single divided image, of optical means for relatively adjusting the image halves in the field of the ocular said means including a refracting wedge arranged in the axis of one of the objectives and adapted to move along said axis between the objective and the image uniting prism, a carrier for said refracting wedge, an index traveling with the carrier, a scale coöperating with the index, said scale and index being relatively adjustable in the direction of travel of the latter to set the instrument for the measurement of the range of the second object in the field by alining the half image on one object with the half image of the other.

5. An instrument of the class described embodying a pair of objectives, an ocular prism and an ocular system coöperating with said objectives to form a single image, a pair of optical wedges arranged one along the axis of each objective and adapted to refract the images formed by the respective objectives in opposite directions, a carriage for the said wedges mounted to be movable along the axes of the objectives, guiding means for the carriage, a pointer mounted on said carriage, said pointer being adjustable in a direction transverse to the direction of movement of the wedge carriage and a scale coöperating with said pointer said scale comprising a plate provided with divergent lines extending in a direction transverse to the direction of movement of the said wedge carriage, substantially as and for the purposes herein set forth.

6. An instrument of the class described embodying: a pair of objectives transversely spaced apart said objectives being each adjustable in a plane transverse to the axes thereof and in directions substantially normal to each other, an ocular prism and an ocular system coöperating with said objectives to form a single divided image, a pair of optical wedges arranged one along the axis of each objective and adapted to refract the images of the respective objectives in opposite directions, a carriage for the said wedges mounted to be movable along the axes of the objectives, guiding means for the carriage, a pointer mounted on said carriage said pointer being adjustable in a direction transverse to the direction of movement of the wedge carriage, a scale coöperating with said pointer said scale comprising a plate provided with divergent lines extending in a direction transverse to the direction of movement of the said wedge carriage, and means whereby the scale may be adjusted in the direction of movement of the said wedge carriage, substantially as and for the purposes herein set forth.

7. In an optical instrument for measuring distances, the combination with a pair of objective lenses having a common focal plane and each adapted to form one of a pair of images of a common object, means acting on the light transmitted by the objectives to shift the images formed thereby in the focal plane, one with relation to the other, and an ocular, of an image uniting prism provided at each of its ends with a primary reflecting surface adapted to receive light from one of the objectives, and to reflect it inwardly, and having a pair of intersecting secondary reflecting surfaces arranged intermediate the primary reflecting surface in the path of light reflected thereby with their intersecting edge disposed in the axis of the ocular and extending in the direction of movement of the images, said secondary surfaces being adapted to receive complementary portions of the images formed by the objectives and to unite them as a single divided whole image.

8. In an optical instrument for measuring distances, the combination with a pair of objective lenses arranged along transversely spaced axes and an ocular, of an image uniting ocular prism having a pair of inwardly facing converging reflecting surfaces arranged one in the axis of each of the objectives and a pair of intersecting outwardly facing reflecting surfaces arranged intermediate the first named reflecting surface and in the axis of the ocular whereby complementary halves of the image of a common object formed by the objective are presented to the ocular one on each side of a straight central dividing line extending across the field of the instrument, adjustable refracting means operating in the path of light between the ocular prism and the objective to move the image halves relatively in the direction of the dividing line until opposite extremities of the image are brought into alinement and means for determining the extent of the image displacement by the refracting means in terms of the distance of the object from the instrument.

BRADLEY A. FISKE.

Witnesses:
B. F. McCay,
Chas. Bartz.